United States Patent [19]

Sakano et al.

[11] Patent Number: 4,813,757
[45] Date of Patent: Mar. 21, 1989

[54] OPTICAL SWITCH INCLUDING BYPASS WAVEGUIDE

[75] Inventors: Shinji Sakano; Hiroaki Inoue, both of Hachiouji; Hiroyoshi Matsumura, Saitama; Hitoshi Nakamura, Kanagawa; Toshio Katsuyama, Hachiouji; Naoki Chinone, Chouhu, all of Japan

[73] Assignee: Hitachi, Ltd., Tokyo, Japan

[21] Appl. No.: 122,343

[22] Filed: Nov. 18, 1987

[30] Foreign Application Priority Data

Nov. 26, 1986 [JP] Japan ............................. 61-279588
Mar. 6, 1987 [JP] Japan ............................. 62-50038

[51] Int. Cl.$^4$ ............................................ G02B 6/10
[52] U.S. Cl. .............................. 350/96.14; 350/96.12; 350/96.13
[58] Field of Search .............. 350/96.12, 96.13, 96.14, 350/96.15, 96.20, 96.16; 357/17, 19

[56] References Cited

U.S. PATENT DOCUMENTS

| | | | |
|---|---|---|---|
| 4,011,543 | 3/1977 | Soref et al. | 350/96.13 X |
| 4,145,109 | 3/1979 | Nelson | 350/96.14 |
| 4,172,630 | 10/1979 | Burns et al. | 350/96.14 |
| 4,201,442 | 5/1980 | McMahon et al. | 350/96.14 |
| 4,262,992 | 4/1981 | Berthold, III | 350/96.14 |
| 4,521,069 | 6/1985 | Ikeda | 350/96.13 |
| 4,681,397 | 7/1987 | Bhatt | 350/96.20 |
| 4,693,547 | 9/1987 | Soref et al. | 350/96.13 |
| 4,715,680 | 12/1987 | Kawaguchi et al. | 350/96.13 X |
| 4,728,166 | 3/1988 | Turner et al. | 350/96.12 |
| 4,728,167 | 3/1988 | Soref et al. | 350/96.13 |
| 4,737,003 | 4/1988 | Matsumura et al. | 350/96.14 |
| 4,770,483 | 9/1988 | Ridgway | 350/96.13 |

FOREIGN PATENT DOCUMENTS

| | | | |
|---|---|---|---|
| 0147195 | 7/1985 | European Pat. Off. | 350/96.14 X |
| 54-7951 | 1/1979 | Japan | 350/96.14 X |
| 54-107351 | 8/1979 | Japan | 350/96.12 |

OTHER PUBLICATIONS

McFee et al., "Beam-Deflection . . . by Free-Carrier Injection in GaAs-AlGaAs Heterostructures" Appl. Phys. Lett. vol. 23 No. 10 11/73 pp. 571-573.
Ishida et al., "InGaAsP/InP Optical Switches . . . Index Change" Appl. Phys. Lett. 1/87 vol. 50 No. 3 pp. 141-142.
Inoue et al., "Switching Characteristics of Optical Switch . . ." Hitachi Cable LTD pub. pp. 147, I-347 (no date).
Kondo et al., "32 Switch Elements Integrated Low--Crosstalk . . ." Opto-Elect. Lab. NEC Corp. pp. 4-78 (no date).
Himeno et al., "Guided-Wave Optical Gate Matrix Switch" NTT Elect. Comm. Lab. pp. I-345-346 (no date).

Primary Examiner—William L. Sikes
Assistant Examiner—Brian M. Healy
Attorney, Agent, or Firm—Antonelli, Terry & Wands

[57] ABSTRACT

Herein disclosed is a branch type optical switch having three or more optical waveguides capable of being coupled to one another in a coupling region, in which is formed a refractive index changing portion for effecting the function of the branch type optical switch by changing the refractive index thereof. This optical switch has a small coupling loss and an excellent extinction ratio. Also disclosed is an intersection type optical switch having two or more optical waveguides intersecting each other. The input optical waveguide and the output waveguide are connected at their intersection by means of a bypass optical waveguide to construct the above-specified branch type optical switch in the coupling regions of the bypass optical waveguides and the input and output optical waveguides, and the bypass optical waveguide has a curved or polygonal shape. Thus, it is possible to provide a small-sized optical switch which has an excellent extinction ratio and little variability in characteristics.

3 Claims, 3 Drawing Sheets

OPTICAL SWITCH INCLUDING BYPASS WAVEGUIDE

BACKGROUND OF THE INVENTION

The present invention relates to an optical switch which is disposed in an optical waveguide and, more particularly, to both a branch type optical switch which has a high coupling efficiency at a branching point of the optical waveguide and an excellent extinction ratio and an optical switch which uses the branch type optical switch so that it has an excellent extinction ratio and a small element length suitable for integration.

One of the branch type optical switches according to the prior art is disclosed, for example, by A. Himeno et al. in National Conference Record, 1985, Semiconductor Devices and Materials, The Institute of Electronics and Communication Engineers of Japan, S7-3, pp. 1-345 to 1-346. This optical switch has no region for changing the refractive index but makes a multi-mode optical waveguide coupling by increasing the width of the optical waveguide at each branching point of the waveguide so as to reduce the coupling loss at the branching point. However, no consideration is given to the coupling to a single-mode optical waveguide with a low loss.

Because of the lack of the refractive index changing portion in the optical waveguide, moreover, much crosstalk seems to occur in the waveguide light.

Moreover, the above-specified prior art gives no consideration to enhancement of the coupling efficiency of two single-mode optical waveguides for coupling one of input optical waveguides and an output optical waveguide but rather uses the multi-mode optical waveguide. This raises another problem of a low efficiency in the coupling with the subsequent single-mode optical waveguide such as a single-mode optical fiber.

The description thus far made is directed to an optical switch of the type having a branching point. An optical switch having two intersecting optical waveguides will be described in the following. The optical switch having this structure is detailed in not only (i) European Patent Laid-Open No. 0147195 but also: (ii) K. Ishida et al., Appl. Phys. Lett., vol. 50, No. 3, January 1987, pp. 141 to 142; (iii) H. Inoue et al., National Conference Record, 1985, Semiconductor Devices and Materials, The Institute of Electronics and Communication Engineers of Japan, S7-4, pp. 1-347; and (iv) K. Ishida et al., Autumn Meeting Record, 1984, The Institute of Applied Physics of Japan, 1p-L-16, pp. 147. The U.S. patent application Ser. No. 684,784 corresponding to the above-specified European Patent Laid-Open No. 0147195 is now pending. All the optical switches disclosed in those references are of the total reflection type, in which the refractive index of a total reflection portion is changed by changing the carrier concentration. Despite this fact, however, the intersection angle has a relatively small value such as 5 or 15 degrees in the Embodiments of the European Patent Laid-Open No. 0147195.

In the optical switch having two intersecting optical waveguides, an intersection angle near 90 degrees may be more desirable for reducing the size. This is desired especially in case a multiplicity of optical switches are arranged in a matrix form.

The corresponding matrix type optical switch is disclosed, for example, by M. Kondo et al., National Convention Record, 1985, The Institute of Electronics and Communication Engineers of Japan, 954, pp. 4 to 78. This optical switch does not make use of optical reflection but has its optical output periodically varied with an increase in the applied voltage so that it is unsuitable for integration because of much variability in the outputs of the individual switch elements on a substrate.

DESCRIPTION OF THE INVENTION

An object of the present invention is to provide a branch type optical switch which can eliminate the aforementioned difficulties concomitant with the prior art so that it has a high coupling efficiency, i.e., a low coupling loss and an excellent extinction ratio.

Another object of the present invention is to provide an optical switch, as will be hereinafter referred to as an intersection type optical switch, which is of the structure having at least two intersecting optical waveguides so that it can have an excellent extinction ratio, a large intersection angle of optical waveguides and a small insertion loss and is suitable for integration.

The branch type optical switch is divided into two types, in which any one of input optical waveguides and an output optical waveguide or an input waveguide and one of output waveguides are coupled depending upon the mode of use. The coupling efficiency and the extinction ratio play important roles in the former and latter cases, respectively.

In order to achieve the above-specified objects, according to the present invention, there is provided an optical switch comprising: at least one branch type optical switch having at least three optical waveguides which can be optically coupled to one another in an optical coupling region and of which at least one of said optical waveguides (which will be hereinafter called the "branch waveguides") except one (which will be hereinafter called the "trunk waveguide") has a refractive index changing portion in said coupling region; and means for changing the refractive index of said refractive index changing portion to provide the function of a branch type optical switch by changing said refractive index.

Typically, in the branch type optical switch, at least three optical waveguides are radially coupled in said coupling region, and the trunk waveguide is coupled to all the branch waveguides at an obtuse angle or linearly in said coupling region, whereas at least one of said branch waveguides has its refractive index changing portion contacting the extension of another of said branch waveguides in said coupling region and extending in the opposite direction to said region.

The change of the refractive index may be accomplished by any method so far as a predetermined refractive index change is attained, but may generally be exemplified by injection of carriers, irradiation with optical beams or application of an electric field to a material having electro-optic effects. The refractive index can be highly changed by changing the carrier concentration of a III-V group compound semiconductor such as GaAs or InP system or a II-VI group compound semiconductor. If the carriers are injected into those compound semiconductors, their concentration in the injecting portion will change to have a different refractive index.

Here, the above-specified coupling region is termed as the meeting point of the individual waveguides and/or its neighbor region.

In the branch type optical switch shown in FIG. 1, a refractive index changing portion 15 is formed in a coupling region of a branch optical waveguide 3, whereas another refractive index changing portion 16 is formed in a coupling region of a branch optical waveguide 4. By adjusting the refractive indices of those refractive index changing portions, the light to be transmitted through the branch optical waveguide 3 is made to hardly leak to the branch optical waveguide 4, whereas the light to be transmitted through the branch optical waveguide 4 is made to hardly leak to the branch optical waveguide 3. As a result, the optical beams to be transmitted through the branch optical waveguides 3 and 4 can be efficiently met and guided into a trunk optical waveguide 6. In FIG. 1, reference numeral 1 denotes input signal light, numeral 2 denotes output signal light, and numeral 10 denotes a substrate. In the optical switch shown in FIG. 1, it is possible by adjusting the refractive indexes of the refractive index changing portions 15 and 16 not only to guide the input signal light into the optical waveguide 3 or 4 and take it out from the optical waveguide 2 but also to guide the input signal light into the optical waveguide 2 and take it out from the optical waveguide 3 and/or the optical waveguide 4.

The refractive indexes of those refractive index changing portions can be so dropped that the optical beams to be transmitted may be totally reflected at the refractive index changing portion of the optical waveguide and take no part in the transmission. The drops of the refractive indices necessary for the total reflection depends upon the angle of the optical waveguides. Generally speaking, the relationship between the angle of two optical waveguides and the change of the refractive indexes necessary for switching, i.e., total reflection is well known in the art.

The above-specified refractive index changing portions have a length of at least 1 μm in the directions of the optical waveguides. If the lengths of the refractive index changing portions are less than 1 μm, the leakage of the light to be transmitted will undesirably increase. These lengths have no special upper limit but are desirably within a range for facilitating production.

The angle made between the individual waveguides of the branch type optical switch of the present invention may be the same as that of the prior art.

Generally speaking, the aforementioned refractive index changing portions are formed in all the branch optical waveguides but may be formed in only one branch optical waveguide in the case (i) in which the optical intensity is modulated by making use of the on/off operation of the one branch optical waveguide, and in the case (ii) in which the system is constructed considering only the on/off operation of the one branch optical waveguide.

The above-specified branch type optical switch of the present invention operates not only as a single-mode switch but also as a multi-mode switch.

As has been described above, the refractive indices of the refractive index changing portions may be changed by changing the carrier concentrations. In this case, a layer of compound semiconductor making up the refractive index changing portions is required to change the carrier concentrations to an extent necessary at least for the optical switching, i.e., for the transmitted optical beams to be totally reflected. But, the means for the changes should not be restricted. Usually, the carriers are injected into an active layer used as the refractive index changing portions by forming a PN junction and by applying a voltage to the PN junction, while using the P portion as the active layer, to cause a forward current to flow. If this current or the applied voltage is changed, the number of carriers injected can be changed. Incidentally, it is a well-known technique in the semiconductor laser field to inject the carriers by forming the PN junction in the layer of compound semiconductor to cause the forward current to flow.

As is also well known in the art, the optical waveguide has predetermined width and thickness and a higher refractive index than the surrounding regions and is formed on a predetermined substrate.

The aforementioned branch type optical switch can be widely used in an optical communication system, which can be represented by the intersection type optical switch having at least two intersecting optical waveguides for guiding an optical signal to be transmitted through one of the optical waveguides into one arbitrary optical waveguide selected from either of the arbitrary optical waveguide or another one or more optical waveguides. In tee neighborhood of an intersection portion 120 of that optical switch, as shown in FIG. 2, one input optical waveguide (e.g., 106) and an output optical waveguide (e.g., 110) are connected by a curved bypass optical waveguide 107 having a curvelinear shape. Refractive index changing portions 113, 114, 115 and 116 are formed in the coupled regions of those waveguides to adjust their refractive indices.

The above-specified branch type optical switches of the present invention are disposed, respectively, in the meeting portion of the curved bypass optical waveguide 107 and the input optical waveguide 106 and in the meeting portion of the curved bypass optical waveguide 107 and the output optical waveguide 110. The input optical waveguide 106 corresponds to the trunk waveguide 6 of the branch type optical switch, whereas the curved bypass optical waveguide 107 and an output optical waveguide 117 correspond to the branch waveguides 3 and 4 of the branch type optical switch. Likewise, the output optical waveguide 110 corresponds to the trunk waveguide 6 of the branch type optical switch, whereas the curved bypass optical waveguide 107 and an input optical waveguide 112 correspond to the branch waveguides 3 and 4 of the branch type optical switch. On the other hand, the refractive index changing portions 113, 114, 115 and 116 correspond to the refractive index changing portions 16 and 15 of the branch type optical switch.

Although not shown in FIG. 2, likewise, a curved bypass waveguide is disposed between the input optical waveguide 112 and the output optical waveguide 117, and the branch type optical switches of the present invention are disposed in the meeting portion of the curved bypass waveguide and the input optical waveguide 112 and in the meeting portion of the curved bypass waveguide and the output optical waveguide 117.

The structures and operations of the branch type optical switch disposed in the intersection type optical switch thus constructed are identical to the aforementioned ones. Although partially overlapped, the intersection type optical switch of the present invention will be described in more detail in the following.

For the adjustment of the refractive indexes of the refractive index changing portions, it is the current practice to make the refractive index of the optical waveguide larger at the light transmitting side and to make the refractive index of the optical waveguide unchanged or smaller at the non-transmitting side. Despite this current practice, however, a variety of modes of change in the refractive indexes are conceivable depending upon the structure of the optical waveguides.

These adjustments of the refractive indices can be accomplished by the known techniques of applying an electric field to the refractive index changing portions, injecting an electric current thereinto or irradiating them with an optical beam. In other words, the refractive indices of those portions can be decreased or increased by the above-exemplified techniques.

FIG. 2 is a top plan view showing the horizontal layout of the intersection type optical switch.

The extinction ratio of this optical switch becomes higher with the larger intersection angle $\theta_0$ of the optical waveguide and the larger branching angle $\theta$ of the optical waveguides at the coupling region. It is also apparent that the optical switch is more small-sized with the larger angles $\theta_0$ and $\theta$. For the larger angle $\theta$, however, larger change in the refractive index is required to exert a restriction upon satisfactory switching characteristics. If, at this time, the bypass optical waveguide is constructed of a linear one, the angle $\theta_0$ is limited by the value of $2\theta$, so that the element length cannot be shortened and a small-sized optical switch cannot be constructed.

If a curved bypass optical waveguide having a radius of curvature r is adopted, as shown in FIG. 2, the value of the angle $\theta_0$ can be $2\theta$ or more so that an optical switch having a smaller size but a higher extinction ratio can be constructed. Here, we have found that remarkably excellent extinction characteristics and small size can be attained if the optical switch is constructed to satisfy the following relationship among the aforementioned angles $\theta_0$ and $\theta$, the radius of curvature r and the distance l between the center of the intersecting portion 120 and the center of the coupling region (i.e., the intersection between the center line of the bypass waveguide 107 and the center lines of the input/output waveguides 106 and 110):

$$l \cos(\theta_0/2) = r \sin(\theta_0/2 - \theta),$$

wherein: $45° \geq \theta \geq 0°$.

It follows that the intersection type optical waveguide of the present invention should more preferably satisfy the above-specified relationship. Incidentally, the curved optical waveguide 107 may have the same structure as that of the other input/output optical waveguides.

On the other hand, a small-sized element having similar extinction characteristics can be attained even if said bypass optical waveguide has a polygonal shape composed of two or more liner optical waveguides. An especially satisfactory range of the angle made between the individual bypass linear optical waveguides of the above-specified type is within 0 to 2 degrees.

In the optical waveguide coupling region of the branch type optical switch portion, the refractive index of the portion unnecessary for coupling is reduced, or the refractive index of a portion of the optical waveguide acting as a coupling passage is enlarged, so that only a certain one of the input optical waveguides may be coupled to a certain one of the output optical waveguides. Then, the light confinement at the coupling portion between the input optical waveguide and the output optical waveguide is improved to reduce the leakage of the beam to another optical waveguide so that the coupling efficiency of the input and output optical waveguides is increased to effect the switching of optical passages. If, at this time, the light waves incident upon an input terminal 101 (or 111) emanate to an output terminal 104 (or 105), they pass through the intersection point 120 of the optical waveguides. Here, leakage to an optical waveguide 109 (or 117) will deteriorate the extinction ratio. However, the leakage becomes smaller with a larger angle $\theta_0$ to enlarge the extinction ratio of the optical switch. According to the present invention, the bypass optical waveguide 107 is formed of the curved optical waveguide so that the angle $\theta_0$ can take a large value to increase the extinction ratio. Also, the increase in the angle $\theta_0$ reduces the element length of the optical switch.

BRIEF DESCRIPTION OF THE DRAWINGS

FIG. 5b is a schematic section showing the optical switch of FIG. 5a; and

DESCRIPTION OF THE PREFERRED EMBODIMENTS

Embodiment 1

Figure 1:
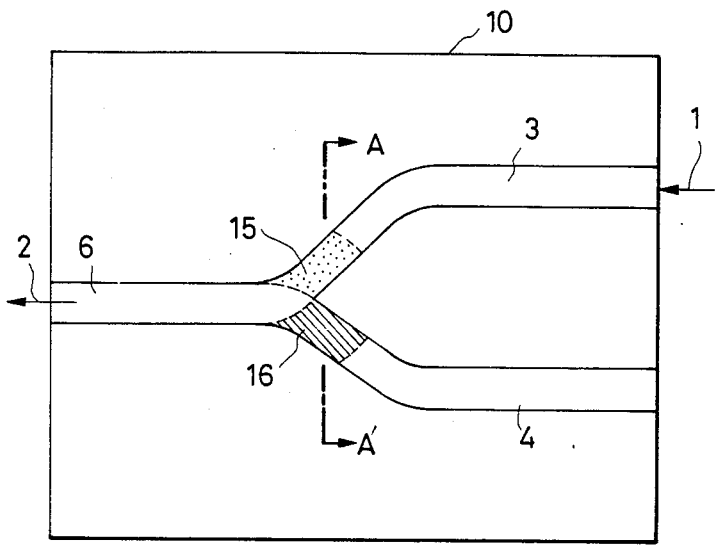
FIG. 1 is a schematic top plan view for illustrating an optical switch according to one embodiment of the present invention.

FIG. 1 shows the branch type optical switch in which the optical waveguides 3, 4 and 6 of InGaAsP were constructed on the InP substrate 10. An InGaAsP layer is overlaid by an InP layer. The optical waveguides were formed by the ordinary liquid phase epitaxy to have a thickness of 1.5 $\mu$m and a width of 3 $\mu$m. The two input optical waveguides 3 and 4 are coupled to the output optical waveguide 6. In the coupling region, the portions 15 and 16 having their refractive indexes dropping are formed of Au-Cr evaporated electrodes. The refractive index changing portions 15 and 16 had a length of 40 $\mu$m in the direction of the optical waveguides. The method of dropping refractive indices are exemplified by applying an electric field to cause a forward current to flow thereby to inject the carriers. In case the optical beam 1 comes from one input optical waveguide 3, the refractive index of the region 16 formed on the input optical waveguide 4 at the opposite side is decreased. As a result, the light confinement in the optical waveguide 3 at the coupling region is improved so that the optical beam 2 efficiently propagates to the optical waveguide 6 at the output side. The coupling loss was as high as 3 dB in the branch type optical switch having no refractive index changing portion according to the prior art, as is well known, but could be reduced to 1 dB or less by the present invention.

The amount of the reduction of the refractive indices of the refractive index changing portions 15 and 16 could reach 0.5 to 1.0%. This reduction depends upon the structure of the refractive index changing portions and the amount of the injected current.

Figure 4A:
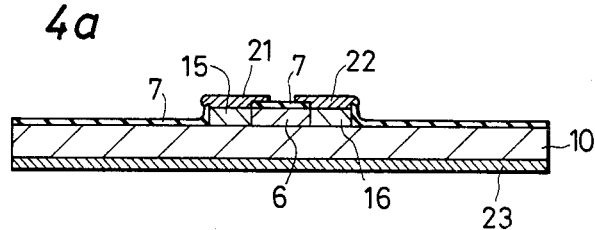
FIGS. 4a and 4b are schematic sections showing the optical switch of FIG. 1.
Figure 4B:
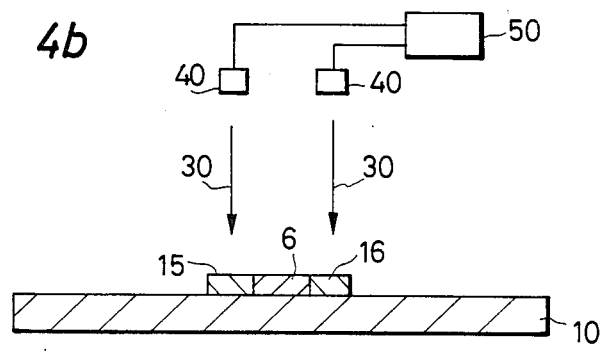

FIGS. 4a and 4b present views equivalent to sections A—A' of FIG. 1, and the former shows one example of the case, in which electrodes 21, 22 and 23 are formed for injecting carriers or applying an electric field, whereas the latter shows one example of the case in which the refractive indices are changed by irradiation with an optical beam. In FIG. 4b, reference numerals 30, 40 and 50 denote a laser beam, a semiconductor laser and a laser drive power source, respectively. In FIG. 4a, reference numeral 7 denotes an insulating film.

Embodiment 2

Figure 3:
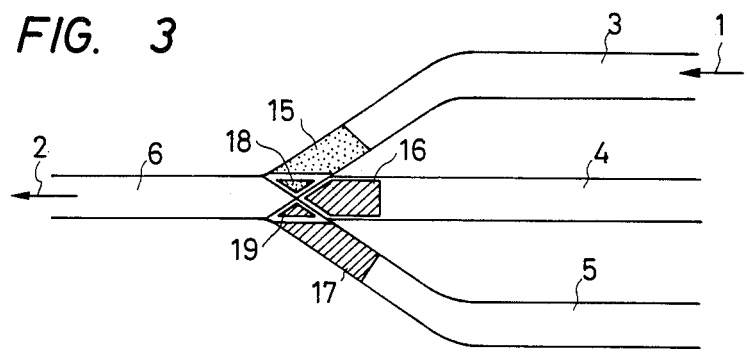
FIG. 3 is a schematic top plan view for illustrating an optical switch according to still another embodiment of the present invention.

The branch type optical switch of the Embodiment shown in FIG. 3 is also constructed of optical waveguides of InGaAsP/InP, which are similar to those of FIG. 1. The difference resides in that the structure is composed of three input optical waveguides 3, 4 and 5 and one output optical waveguide 6. In this case, the refractive index dropping region is divided into five refractive index changing portions 15, 16, 17, 18 and 19. The spacings among these individual refractive changing portions may be of any size to ensure sufficient electric insulations.

In case the optical beam 1 comes into the branch waveguide 3 which is one input optical waveguide, the refractive indices of the refractive index changing portions 16, 17 and 19 corresponding to the coupling portion of the remaining branch optical waveguides 4 and 5 are dropped to improve the light confinement of the optical waveguide 3 in the coupling region so that the optical beam 2 can efficiently propagate to the trunk optical waveguide 6 at the output side.

As compared with the branch type optical switch having no refractive index changing portion according to the prior art, the branch type optical switch of the present Embodiment can have its coupling efficiency improved by 5 dB.

Figure 5A:
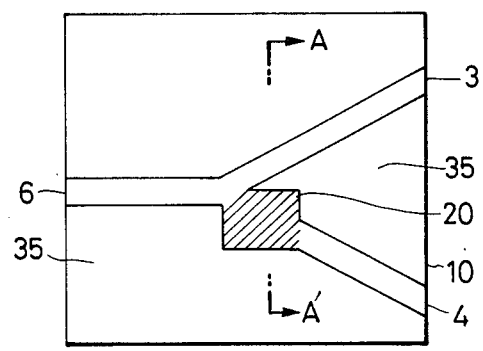
FIG. 5a is a schematic top plan view showing a modification of the optical switch of FIG. 1 or FIG. 3.
Figure 5B:
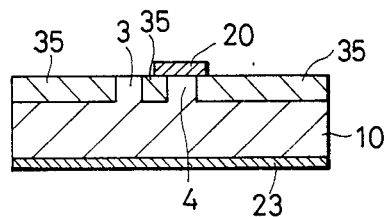

The Embodiments 1 and 2 have been described as to the cases in which only the refractive indices of the optical waveguides are changed. As shown in FIG. 5a, however, an electrode 20 is formed to extend not only over the optical waveguides but also over their adjoining clad region 35 so that effects similar to those of the aforementioned optical switch can be attained even if the refractive index changing portions contain predetermined portions of the desired optical waveguides and extend over the clad region. FIG. 5b presents a schematic sectional view showing the section A—A' of the optical switch of FIG. 5a.

In the Embodiments 1 and 2, the change in the refractive indices is effected by injecting the carriers. As is well known in the art, similar effects can be attained by selecting the materials, structure and applied voltage to change the refractive indices by the electro-optic effect resulting from the application of the electric field. Similar effects can also be attained by irradiating the refractive index changing portions with an optical beam, as is well known in the art.

In the Embodiments 1 and 2, moreover, the description has been directed to the method by which the branch optical waveguides are disposed at the incident side whereas the trunk optical waveguide is disposed at the emanating side so that optical signals coming from a plurality of optical waveguides may be guided into one optical waveguide. However, naturally an optical signal coming from one optical waveguide can be guided selectively into one optical waveguide from a plurality of the optical waveguides by disposing the trunk optical waveguide at the incident side and the branch optical waveguides at the emanating side.

In the Embodiments 1 and 2, similar results could be obtained if the optical waveguides had a thickness of 0.3 to 5 $\mu$m and a width of 0.5 to 10 $\mu$m.

Embodiment 3

Figure 2:
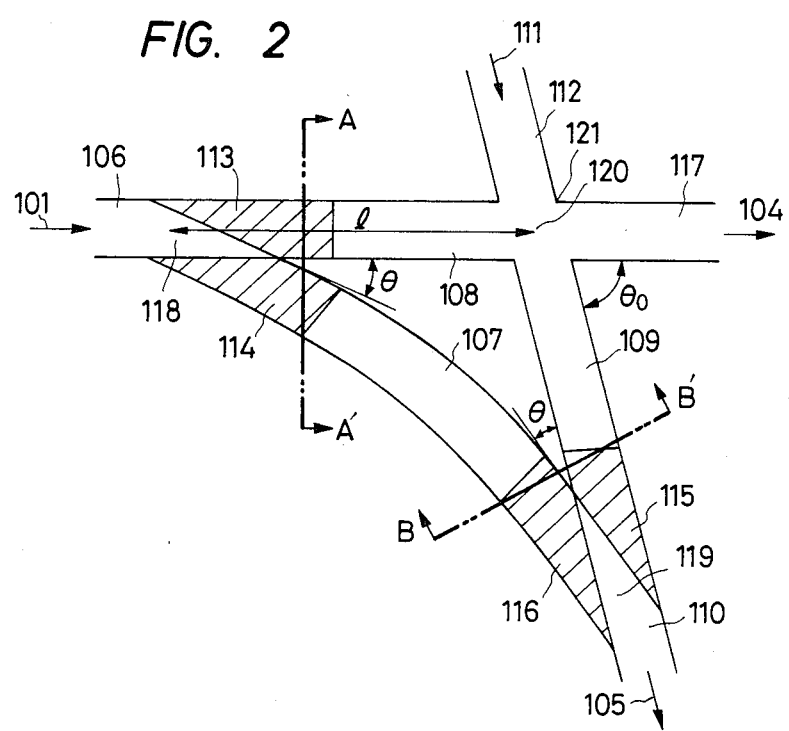
FIG. 2 is a schematic top plan view for illustrating an optical switch according to another embodiment of the present invention.

This Embodiment relates to an intersection type optical switch having two input terminals and two output terminals, in which the optical waveguides constructed of a core region and a clad region are made of InGaAsp whereas the surrounding area is made of InP. As shown in FIG. 2, the input optical waveguides 106 and 112 are coupled to the output optical waveguides 110 and 117 through an optical switch which is composed of an X-optical branch 121 and Y-optical branches 118 and 119. The optical coupling portion of the Y-optical branches 118 and 119 is formed with the regions 113, 114, 115 and 116 in which the refractive indices drop. The input optical waveguide 106 and the output optical waveguide 110 are connected through the curved bypass optical waveguide 107. The reduction of the refractive indices is accomplished by injecting carriers, for example. When an the optical beam 101 comes into the input optical waveguide 106 and emanates as the emanating beam 105 to the output optical waveguide 110, the refractive indices of the regions 113 and 115 are dropped. At this time, the optical waveguides 106, 107 and 110 are selectively coupled so that the light waves 105 efficiently emanate. If the emanating light 104 is guided into the output optical waveguide 117, on the other hand, the refractive index of the region 114 is dropped to selectively couple the optical waveguides 106, 108 and 117 so that the light 104 efficiently emanates. If the light waves 111 are incident upon the input optical waveguide 112 and emanates to the output optical waveguide 110, the refractive index of the region 116 can be dropped to selectively couple the optical waveguides 112, 109 and 110. At this time, $l=100$ $\mu$m, $\theta=7°$, $r=2$ mm, and $\theta_0=19°$. The the optical waveguides had a thickness of 1.5 $\mu$m and a width of 3 $\mu$m, and satisfactory results were attained for the thickness of 0.3 to 5 $\mu$m and the width of 0.5 to 10 $\mu$m. The refractive index changing portions 113, 114, 115 and 116 had a length of 40 to 60 $\mu$m in the direction of the optical waveguides.

The aforementioned Y-optical branches 118 and 119 are the aforementioned branch type optical switches of the present invention, which may be referred to in the Embodiments 1 and 2 description made above.

The input optical waveguide 112 and the output optical waveguide 117 are connected through a curved bypass optical waveguide similar to the aforementioned one and have refractive index changing portions similar to the aforementioned ones, which are not shown in FIG. 2.

The optical switch according to the present Embodiment can provide a larger intersection angle than that of the total reflection type optical switch of the prior art and is free from the problem that the individual switching elements highly vary, as in the matrix type optical switch of the prior art.

In this Embodiment, moreover, the bypass optical waveguide is curved (with the radius of curvature r of 2 mm). The linear optical switch (in which $l=100$ μm, $\theta=7°$, $r=\infty$ and $\theta_0=14°$) had an extinction ratio of 15 dB. On the contrary, the optical switch of the present Embodiment according to the present invention had a satisfactory extinction ratio of 25 dB or more.

The description of the present Embodiment has been directed to the structure in which only the refractive indices of the optical waveguides were changed. However, similar effects can be attained even if the refractive index changing regions contain the desired optical waveguides and extend over the clad regions.

In the present Embodiment, moreover, the refractive indices were changed by applying forward current, as in the Embodiments 1 and 2, to inject carriers. Despite this fact, however, the same effects can be attained even if the refractive indices are changed by electro-optic effects, as is well known in the art, by suitably selecting the materials and by applying electric field. Similar effects can also be attained if the refractive index changing portions are irradiated with an optical beam to change their refractive indices.

In the present Embodiment, the switching operations are accomplished by using both the refractive index changing regions 113 and 114, and 115 and 116 of the Y-optical branches 118 and 119. However if the branching angle $\theta$ is sufficiently large or larger than 3 degrees, similar switching operations can be attained by forming the changing regions 113 and 115 only on the sides of the input and output optical waveguides.

Figure 6A:
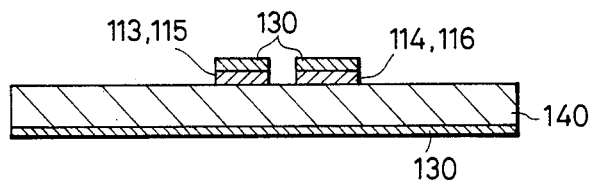
FIGS. 6a and 6b are schematic sections showing the optical switch of FIG. 2.
Figure 6B:
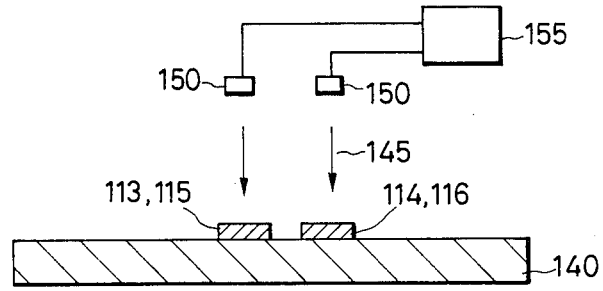

FIGS. 6a and 6b present A—A' and B—B' sections of FIG. 2. FIG. 6a shows one example in which there are formed electrodes 130 for injecting carriers or applying an electric field, and FIG. 6b shows one example of the case of irradiation with an optical beam.

In the embodiment of FIG. 6a, the electrodes 130 are formed on the refractive index changing portions 113, 114, 115 and 116 and on the back of the substrate 140 and are connected with the known power source (not shown) to apply an electric field thereto or inject an electric current thereinto, thus changing the refractive indices of the portions.

In FIG. 6b, on the other hand, the refractive index changing portions 113, 114, 115 and 116 formed on the substrate 140 are irradiated with an optical beam 145 by the use of a semiconductor laser 150 so that their refractive indices can be changed. In FIG. 6b, reference numeral 155 denotes a laser drive power source.

The substrate may be made of GaAs system or $LiNbO_3$ although it has been made of InP in the aforementioned individual Embodiments. Moreover, the individual portions were formed by a well-known crystal growth method and etching method. In addition, the known technique concerning the optical waveguides, e.g., the technique of the foregoing European Patent Laid-Open No. 0147195 can be used in the optical switch of the present invention.

In the individual Drawings presented, the same reference numerals denote substantially the same portions. FIGS. 2 and 3 have omitted presentation of the substrate.

The branch type optical switch thus far described according to the present invention has a remarkably small loss because the branch optical waveguides are provided with the refractive index changing portions. For example, the loss is reduced by about 3 dB for the branch type optical switch of two-input and one-output optical waveguides and by about 5 dB on an average for that of three-input and one-output optical waveguides so that the power of the signal light can be maintained to enhance the S/N ratio. Thus, the effects of the branch type optical switch of the present invention are similar even in the case of the branch type switch of one-input and multi-output optical waveguides. Incidentally, the multi-input and one-output type and the one-input and multi-output type are in the modes of use of an identical branch type optical switch.

The intersection type optical switch using the aforementioned branch type optical switch according to the present invention and having the curved bypass optical waveguides can have a large intersection angle of its component X-optical branches so that it can have a large extinction ratio, and has little variability in characteristics among the individual optical switch elements on the substrate so that it can be small-sized and suited for large scale integration.

What is claimed is:

1. In an intersection type optical switch including at least two mutually intersecting optical waveguides for guiding an optical signal to be transmitted through one optical waveguide into another optical waveguide selected from the other one or more optical waveguides,
    an optical switch comprising: a bypass optical waveguide for optically connecting one input optical waveguide at one intersection to an output optical waveguide adjacent thereto to construct branch type optical switches with both the coupling region of said bypass optical waveguide and said input optical waveguide and the coupling region of said bypass optical waveguide and said output optical waveguide,
    wherein said branch type optical switches have, at least in the input optical waveguide portion and output optical waveguide portion, refractive index changing portions contacting the extension of said bypass optical waveguide in the coupling regions and extending in the opposite direction to said coupling regions; and have means for changing the refractive indices of said refractive index changing portions to operate said branch type optical switch, and wherein said bypass optical waveguide has a curved and/or polygonal shape;
    and also wherein the following relationship holds among the angle of intersection $\theta_0$ of said intersecting optical waveguides, the branching angle $\theta$ of the optical waveguides in said coupling regions, the radius of curvature r of said bypass optical waveguide, and the distance l between the center of the intersection of said intersecting optical waveguides and the center of said coupling region:

$$l\cos(\theta_0/2) = r\sin(\theta_0/2 - \theta),$$

wherein:

$$45° \geq \theta \geq 0°.$$

2. In an intersection type optical switch including at least two mutually intersecting optical waveguides for guiding an optical signal to be transmitted through one optical waveguide into another optical waveguide selected from the other one or more optical waveguides,
    an optical switch comprising: a bypass optical waveguide for optically connecting one input optical waveguide at one intersection to an output optical waveguide adjacent thereto to construct branch type optical switches with both the coupling region of said bypass optical waveguide and said input optical waveguide and the coupling region of said bypass optical waveguide and said output optical waveguide, wherein said branch type optical switches have, at least in the input optical waveguide portion and output optical waveguide portion, refractive index changing portions contacting the extension of said bypass optical waveguide in the coupling regions and extending in the opposite direction to said coupling regions; and have means for changing the refractive indices of said refractive index changing portions to operate said branch type optical switch, and wherein said bypass optical waveguide has a curved and/or polygonal shape;

and also wherein the branching angle of said optical waveguides in said coupling region is at least 3 degrees.

3. An optical switch according to claim 1, wherein the branching angle of said optical waveguides in said coupling region is at least 3 degrees.

* * * * *